United States Patent [19]
Becker

[11] 3,904,651
[45] Sept. 9, 1975

[54] ORGANO PEROXIDES
[75] Inventor: Joseph J. Becker, Geneva, Switzerland
[73] Assignee: Firmenich SA, Geneva, Switzerland
[22] Filed: July 9, 1973
[21] Appl. No.: 377,566

Related U.S. Application Data
[62] Division of Ser. No. 41,595, May 28, 1970, abandoned.

[30] Foreign Application Priority Data
May 29, 1969 Switzerland.......................... 8192/69
May 27, 1970 Switzerland.......................... 7865/70

[52] U.S. Cl. ............. 260/345.2; 252/522; 260/343; 260/586 M; 204/158 R; 260/346.2 R; 260/333; 260/468 K
[51] Int. Cl.² ........................................ C07D 311/94
[58] Field of Search ................................. 260/345.2

[56] References Cited
UNITED STATES PATENTS
3,528,898  9/1970  Story.................................... 260/343
3,546,251  12/1970  Matsumoto et al............. 260/345.2

*Primary Examiner*—John M. Ford
*Attorney, Agent, or Firm*—Pennie & Edmonds

[57] ABSTRACT

New methods for the preparation of lactones possessing odoriferous properties and containing 14 to 17 ring carbon atoms in their molecule.

6 Claims, No Drawings

ORGANO PEROXIDES

This is a division of application Ser. No. 41,595, filed May 28, 1970, now abandoned.

SUMMARY OF THE INVENTION

The invention relates to a new method for the preparation of lactones having the formula

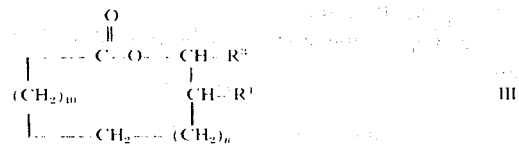

wherein $R^3$ and $R^4$ represent hydrogen or one of them a methyl radical and the other hydrogen and $n$ an integer from zero to 3, and wherein the total of the ring carbon atoms is 14 to 17, and of their unsaturated derivatives of formula

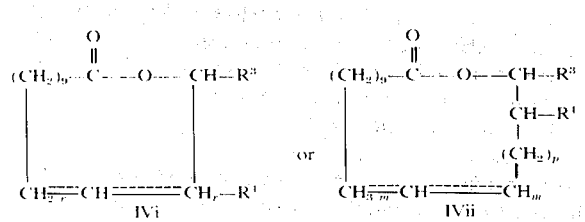

containing one double bond in one of the positions indicated by the dotted lines, and wherein $r$ is zero or 1, $m$ is 1 or 2 and $p$ is an integer from zero to 2, and $R^3$ and $R^4$ have the same meaning as indicated above. Said lactones, some of which are new compounds, possess interesting odoriferous properties and, consequently, are useful in the perfume industry as perfuming and fragrance modifying agents for the manufacture of perfumes and perfumed products.

DESCRIPTION OF THE PREFERRED EMBODIMENTS

According to the invention the method for preparing lactones III comprises cleaving by means of thermic or radiation energy, or chemical agents a peroxide having the formula $$R^1—O—O—R^2$$

wherein $R^1$ represents hydrogen, a hydrocarbon radical, an acyl group or a group of formula

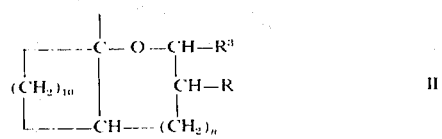

and $R^2$ represents a group of formula II, provided that when $R^1$ and $R^2$ represent a group of formula II they are identical, to give a mixture comprising a lactone of formula III and the corresponding unsaturated lactone IVi or IVii, and either separating the lactone III from said mixture or hydrogenating the aforesaid mixture or the unsaturated compound IVi or IVii, separated from said mixture. $R^3$, $R_4$ and $n$ in formula II have the same meanings as in formula III.

The cleavage of peroxide I can be carried out by using free radical-initiating techniques, for example, by supplying thermic or radiation energy, or by using reactants which contain unpaired electrons.

The thermal cleavage can be carried out by heating peroxide I in the presence or absence of organic solvents at a temperature comprised between 80° and 150° C. As organic solvents, liquid hydrocarbons with the boiling point in the region of 80° C can be conveniently used. Preferably, aromatic hydrocarbons, such as, for example, toluene or xylene, are used. According to a preferred mode of operation a solution of peroxide I in xylene is heated at a temperature comprised between 130° and 150° C. A mixture of o-, m- and p-xylene can also be used.

By thermocleavage peroxide I gives a mixture comprising a lactone having the formula III and the corresponding unsaturated lactone IVi, ii. The ratio of the saturated lactone to its unsaturated derivative varies within wide limits and is dependent on the reaction conditions under which the cleavage of peroxide I is carried out. For instance, the influence of the solvent is shown by the fact that when 12-hydroperoxy-13-oxabicyclo[10.4.0]hexadecane is allowed to cleave in solution in m-xylene a mixture consisting of 83.2 % of 15-pentadecanolide and 16.8 % of 15-pentadec-(11 and 12)-enolide is obtained. When the same hydroperoxide is allowed to cleave in solution in p-xylene and o-xylene, respectively, mixtures consisting of 70.8 and 60 % of saturated lactone, and 29.2 and 40 % of unsaturated lactone are obtained.

The cleavage of hydroperoxide I can also be promoted photochemically by the action, for example, of ultraviolet light on either the neat hydroperoxide I or a solution of the hydroperoxide I in an organic solvent. As solvents, chlorinated hydrocarbons, such as, for example, chloroform, carbon tetrachloride or trichloroethylene, or ethers, such as dioxan, tetrahydrofuran or monoglyme, can be used.

By photochemical cleavage, as in the case of the thermal process, the epoxide I yields a mixture of saturated and unsaturated lactones.

According to another embodiment of the invention, lactones III are obtained by cleaving peroxide I by means of reducing agents.

Suitable reducing agents comprise inorganic ions that can change their valence state by loss of a single electron, for instance, ions of heavy metals, such as iron, cobalt or copper, or reducing agents commonly known to generate nascent hydrogen, for example, metal combinations such as aluminium, manganese, zinc, iron, cadmium, cobalt, nickel, tin or lead and acids, or an alkali metal and an alcohol, e.g. sodium or potassium in methanol, ethanol or tert.-butanol, or even an alkali metal sulphite, hydrogen sulphite, thiosulphate, dithionate or pyrosulphite in the presence of an organic solvent.

It may be assumed that with certain of the cleaving agents mentioned above the cleavage of peroxide I follows a mechanism pattern of homolysis wherein the O-O bond of the peroxide

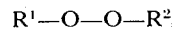

group cleaves in order to give the

and OR¹ radicals.

The reaction was found to be accelerated in the presence of an alcohol, such as methanol, ethanol, n-propyl alcohol, isopropyl alcohol, n-butyl alcohol, isobutyl alcohol, sec.-butyl alcohol, cyclohexyl alcohol or mixtures thereof. The temperature at which said reaction can occur is not critical. It is preferable to operate at a temperature comprised between about 20° and about 60° C.

A preferred mode of operation comprises adding, at a temperature comprised between 20° and 28° C, to a vigorously stirred aqueous buffer solution of sodium sulphite and sodium hydrogen sulphite a solution of peroxide I in chloroform and isopropyl alcohol, decanting the organic phase, extracting the aqueous solution with chloroform and evaporating the combined organic extracts to give a mixture comprising lactones III and IVi, ii.

The mixtures of lactones obtained according to the present invention can be used as such, i.e. without separation of their components, as odoriferous substances. If desired, it is also possible to separate the saturated lactones from its unsaturated derivative by distilling the obtained mixture by means of a highly effective distillation column. Furthermore, said mixtures can be hydrogenated, for instance, by catalytic hydrogenation at room temperature in the presence of Raney nickel catalyst, in order to give the saturated lactone as sole product. The mixture obtained according to the invention and their individual components are odoriferous substances which develop a more or less characteristic musk-like odour.

The starting materials I, used in the present invention, can be obtained by treating compounds of formula

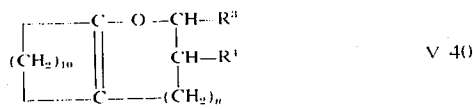

wherein the symbols R and the index n have the same meaning as indicated for formula II, with hydrogen peroxide or a hydroperoxide having the formula R¹—OOH, wherein R¹ represents a hydrocarbon radical, such as an alkyl, e.g. tert.-butyl, a cycloalkyl, an aralkyl or an aryl radical, or an acyl group, e.g. benzoyl. tert.-Butyl-peroxide is preferred. The peroxides of formula I wherein R¹ and R² are the same and represent a group having formula II, can be prepared by treating bicyclic ethers V with hydrogen peroxide in the presence of sulphuric acid at a temperature comprised between about 10° and about 25° C, preferably between 12° and 14° C, and allowing the reaction mixture to react at that temperature during 20–30 minutes. The peroxide of formula I, wherein the symbol R¹ represents hydrogen, can be obtained by allowing the bicyclic ethers V to react with hydrogen peroxide in the presence of sulphuric acid at a temperature of about 0° C during 20–30 minutes.

According to the invention, bicyclic ethers of formula

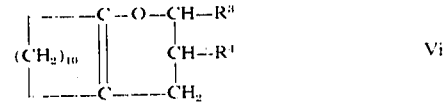

are prepared by adding to 2-ethoxycarbonyl-cyclododecanone a compound of formula

wherein the symbols R represent hydrogen or one of them a methyl radical and the other hydrogen, reducing the resulting addition compound to the corresponding carbinol, subjecting the obtained carbinol to saponification and decarboxylation in an alkali solution and cyclising the resulting keto-alcohol by means of an acidic agent.

According to a preferred mode of operation, the reduction to the carbinol is carried out by means of sodium borohydride.

As acidic cyclising agents mineral or organic acids, such as hydrochloric acid, phosphoric acid, sulphuric acid, benzenesulfonic acid, p-toluenesulfonic acid or trifluoracetic acid, or acidic diatomaceous earths can be used. Halogens, such as iodine, can also be conveniently used.

The above cyclisation can be carried out by dissolving the product to be cyclised in the presence of the acidic agent into an inert organic solvent such as an aliphatic, a cycloaliphatic, an aromatic, an araliphatic or a chlorinated hydrocarbon, or an ether, such as dioxan, tetrahydrofuran or monoglyme.

Acidic diatomaceous earths in hexane are preferred.

2-Ethoxycarbonyl-cyclododecanone, the starting material in the above process, can be synthesized from cyclododecanone, a cheap commercially available product, according to known synthetic methods [e.g. Tetrahedron 19, 1625 (1963)].

Scheme I hereinbelow illustrates the above described process.

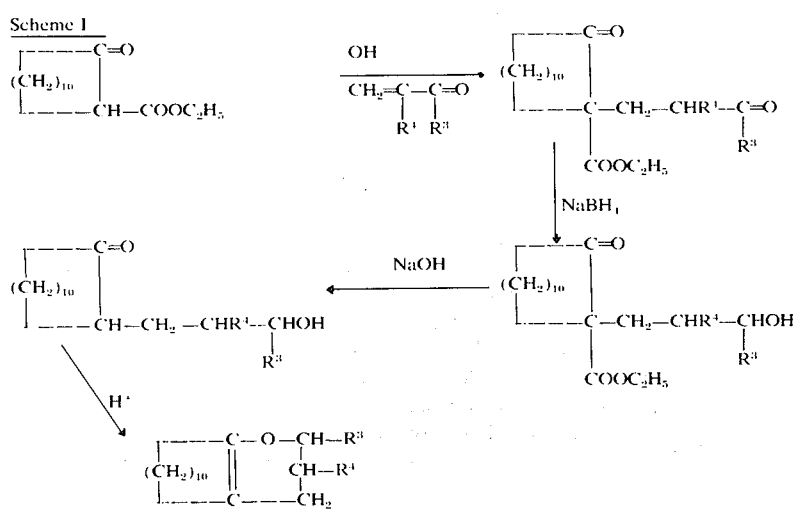

In the above scheme the symbols R have the same meaning as indicated for formula VI.

Besides, bicyclic ethers V, used in the process described in the present specification for the preparation of lactones III and IVi, ii, can be synthesized according to known synthetic methods and their preparation is illustrated in Scheme II.

Scheme II

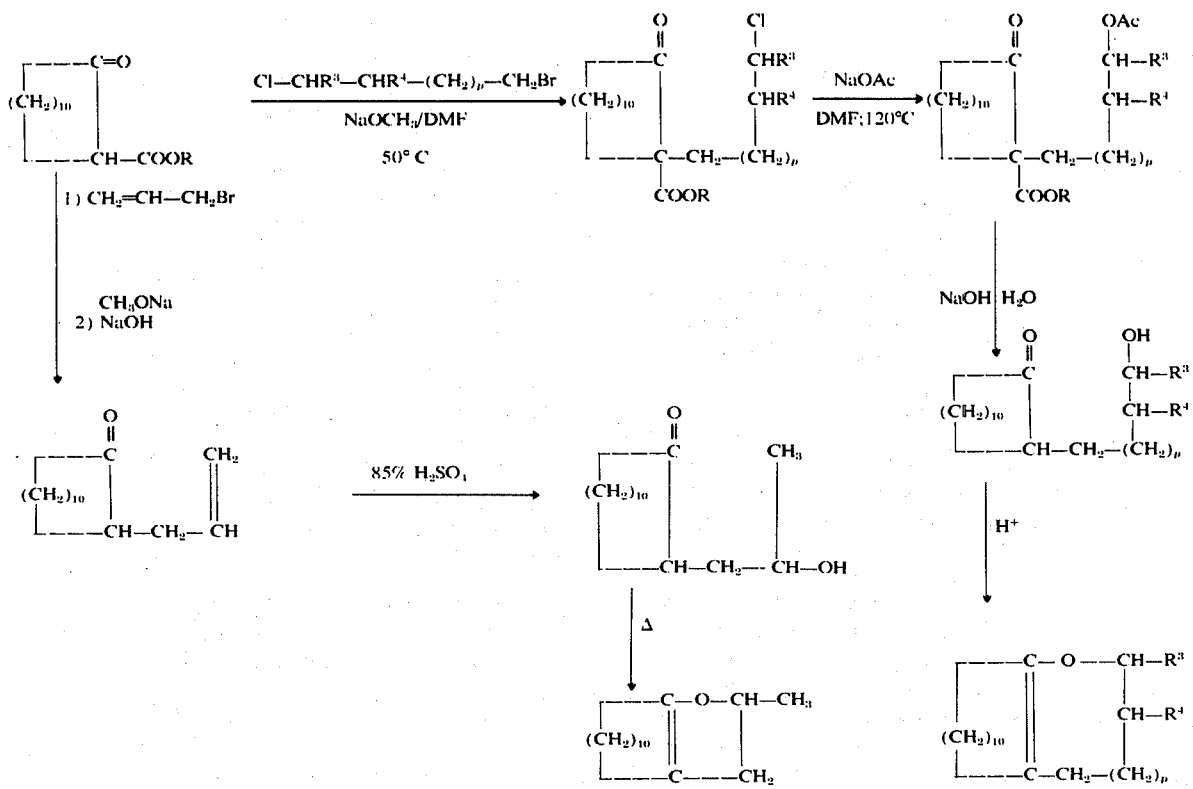

In the above Scheme the symbols R and the index p have the same meaning as indicated for formula IVii.

The unsaturated lactones IV of the present invention form, according to the position of the double bond, two isomers, each of them possessing a cis- or trans-configuration. These various isomers can be separated by means of preparative vapour phase chromatography.

Specific examples of compounds comprised by the various structural formulae shown hereinbefore include:

12-hydroperoxy-13-oxabicyclo[10.4.0]hexadecane,
12-tert.-butylperoxy-13-oxabicyclo[10.4.0]hexadecane,
di-[13-oxabicyclo[10.4.0]hexadec-12-yl]peroxide,
12-hydroperoxy-13-oxa-14-methylbicyclo[10.4.0]hexadecane,
12-hydroperoxy-13-oxa-15-methylbicyclo[10.4.0]hexadecane,
14-methyl-14-tetradecanolide,
15-methyl-15-pentadecanolide,
14-methyl-15-pentadecanolide,
15-hexadecanolide,
17-heptadecanolide,
16-methylhexadecanolide,
15-methyl-16-hexadecanolide,
17-methyl-17-heptadecanolide,
16-methyl-17-heptadecanolide,
cis-15-pentadec-11-enolide,
trans-15-pentadec-11-enolide,
cis-15-pentadec-12-enolide,
trans-15-pentadec-12-enolide,
cis-14-methyl-15-pentadec-11-enolide,
trans-14-methyl-15-pentadec-11-enolide,
cis-15-methyl-15-pentadec-11-enolide,
trans-15-methyl-15-pentadec-11-enolide,
cis-14-methyl-15-pentadec-12-enolide,
trans-14-methyl-15-pentadec-12-enolide,
cis-15-methyl-15-pentadec-12-enolide,
trans-15-methyl-15pentadec-12-enolide,
cis-16-hexadec-11-enolide, trans-16-hexadec-11-enolide,
cis-16-hexadec-12-enolide,
trans-16-hexadec-12-enolide,
cis-15-methyl-16-hexadec-11-enolide,
trans-15-methyl-16-hexadec-11-enolide,
cis-15-methyl-16-hexadec-12-enolide,
trans-15-methyl-16-hexadec-12-enolide,
cis-16-methyl-16-hexadec-11-enolide,
trans-16-methyl-16-hexadec-11-enolide,
cis-16-methyl-16-hexadec-12-enolide,
trans-16-methyl-16-hexadec-12-enolide,
cis-17-heptadec-11-enolide,
trans-17-heptadec-11-enolide,
cis-17-heptadec-12-enolide,
trans-17-heptadec-12-enolide,
cis-16-methyl-17-heptadec-11-enolide,
trans-16-methyl-17-heptadec-11-enolide,
cis-16-methyl-17-heptadec-12-enolide,
trans-16-methyl-17-heptadec-12-enolide,
cis-17-methyl-17-heptadec-11-enolide,
trans-17-methyl-17-heptadec-11-enolide,
cis-17-methyl-17-heptadec-12-enolide,
trans-17-methyl-17-heptadec-12-enolide.

The invention will be illustrated in a more detailed manner by the following Examples. In said Examples the temperatures are given in degrees centigrade.

EXAMPLE 1

A suspension of 12-hydroperoxy-13-oxabicyclo[10.4.0]hexadecane (439 g) in 2500 ml of xylene was added portionwise under vigorous stirring to 2400 ml of boiling xylene. The reaction mixture was left 10 minutes at reflux temperature then allowed to cool. By evaporation of the volatile components under reduced pressure, there were obtained 519.2 g of crude material, which, by fractional distillation, gave a fraction at b.p. 73°–160°/0.3 Torr. This fraction was redistilled by means of a Vigreux column and yielded 313 g of a substance containing 89 % of 15-pentadecanolide and 11 % of 15-pentadec-(11 and 12)-enolide. 12-Hydroxy-15-pentadecanolide (98 g) was obtained as by-product.

The mixture of pentadecanolide and 15-pentadec-(11 and 12)-enolide can be either used directly as it stands as perfuming substance or submitted to catalytic hydrogenation in order to obtain complete conversion to pentadecanolide. In a typical experiment, the catalytic hydrogenation is carried out as described hereinbelow.

To a solution of 313 g of a mixture of pentadecanolide and 15-pentadec-(11 and 12)-enolide (obtained according to the procedure described hereabove) in 1.5 litre of methanol, 50 g of a 30 % Raney nickel suspension and 5 ml of a 10 % aqueous solution of $Na_2CO_3$ were added and the mixture was shaken in an atmosphere of hydrogen for 3½ hours. In the above process, 3600 ml of hydrogen were consumed. The reaction mixture was filtered and the clear filtrate evaporated to dryness. The obtained residue was dissolved in 300 ml of ether and 300 ml of toluene and the resulting solution washed with water until neutral, dried over $Na_2SO_4$ and evaporated in vacuo. 311 g of crude product, containing ca. 90 % pentadecanolide, were thus obtained.

12-Hydroperoxy-13-oxabicyclo[10.4.0]hexadecane, used as starting material in the above process, can be obtained as follows:

To a solution of 13-oxabicyclo[10.4.0]hexadec-1(12)-ene (2222 g, 10 Mole) in 10 litres of 90 % acetic acid at 0°, 52 % aqueous solution of hydrogen peroxide (1000 g, 15.3 Mole) and 500 g of concentrated sulphuric acid were added (27 minutes). During the addition of hydrogen peroxide, the temperature of the reaction mixture was kept at −1/+1°, then at 0° while stirring for 15 additional minutes. 12-Hydroperoxy-13-oxabicyclo[10.4.0]hexadecane (3629 g) was obtained as wet solid product by filtration of the above mixture followed by washing with 3 litres of 50 % acetic acid and water. After drying 2160 g of product with m.p. 103°–114° were obtained.

EXAMPLE 2

A solution of 190 g of di-[13-oxabicyclo[10.4.0]-hexadec-12-yl]-peroxide in 500 ml of xylene was added dropwise to 600 ml of boiling xylene (70 minutes). After cooling, the reaction mixture was evaporated under reduced pressure and the residue distilled to give 139.4 g of a mixture of 15-pentadecanolide and 15-pentadec-(11 and 12)-enolide, b.p. 105°–107°/0.2 Torr.

This mixture was dissolved in 750 ml of methanol and 25 g of a 30 % Raney nickel suspension and 1 ml of a 10 % aqueous $Na_2CO_3$ solution were added to it. Under the same conditions as those described in Example 1 the mixture was subjected to hydrogenation. One hour was required and 1200 ml of hydrogen were consumed. After the usual treatments [cf. Example 1], 139 g of pentadecanolide were obtained.

Di-[13-oxabicyclo[10.4.0]hexadec-12-yl]-peroxide, used as starting material in the above process, can be obtained as follows:

To a solution of 13-oxabicyclo[10.4.0]hexadec-1(12)-ene (222.2 g, 1 Mole) in 1 litre of glacial acetic acid at 12°, a 52 % solution of hydrogen peroxide (400 g) and 200 g of concentrated sulphuric acid were added (20 minutes). After stirring for 30 additional minutes at 8°, the mixture was filtered. The peroxide was obtained as a wet solid product by filtration of the above mixture followed by washing with 450 ml of 50 % acetic acid and water. After drying, 190 g of di-[13-oxabicyclo[10.4.0]hexadec-12-yl]-peroxide having m.p. 134°–6° were obtained.

EXAMPLE 3

36 g of a 75 % solution of tert.-butylhydroperoxide (0.3 Mole) were added to a solution of 13-oxabicyclo[10.4.0]hexadec-1(12)ene (44.4 g, 0.2 Mole) in 250 ml of acetic acid. To this mixture 15 g of concentrated sulphuric acid and 100 ml of glacial acetic acid were added at such a rate as to maintain the temperature below 14°. After having been kept at 10°–12° for 30 additional minutes, the mixture was poured into 1000 ml of ice-cold water and 300 ml of ether and stirred for 10 minutes. The aqueous phase was decanted and extracted with more ether. The combined extracts, after the usual treatments of washing (10 % aqueous solution of $NaHCO_3$ and water) and drying ($Na_2SO_4$), yielded, by evaporation under reduced pressure, 56 g of crude 12-tert.-butylperoxy-13-oxabicyclo[10.4.0]hexadecane.

A solution of crude hydroperoxide (56 g) in 150 ml of xylene was slowly added under vigorous stirring to 250 ml of boiling xylene (90 minutes). According to the same procedure as that described in Example 1, the mixture of pentadecanolide and 15-pentadec-(11 and 12)-enolide was obtained in a 40 % yield (relative to 13-oxabicyclo[10.4.0]hexadec-1(12)-ene).

Pure pentadecanolide was obtained by hydrogenating the above mixture according to Example 1.

13-Oxabicyclo[10.4.0]hexadec-1(12)-ene used for the preparation of the hydroperoxides of Examples 1–3 and 8 can be prepared as follows:

A solution of 8 kg of 1-bromo-3-chloropropane in 8 kg of dimethylformamide was added under stirring to a solution of sodium methoxide (2.9 kg, 53.7 Mole) and 2-ethoxycarbonyl-cyclododecanone (12.7 kg, 49.9 Mole) in 55 kg of dimethylformamide. The reaction is exothermic and, by standing 25 minutes, the mixture reached a temperature of 60°. It was then left at room temperature during one night. The 2-ethoxy-2-[3-chloropropyl]-cyclododecanone, obtained in the above process, was not isolated from the reaction mixture but was used as it stood for the next step. After addition of anhydrous sodium acetate (5 kg), the reaction mixture was left under stirring at 110°–120° during 10 hours, then the dimethylformamide was evaporated off under reduced pressure. The obtained residue, after dilution with 20 litres of toluene, washing with water and evaporation of the volatile components in vacuo, gave the crude 2-ethoxycarbonyl-2-[3-methoxycarbonyl-propyl]-cyclododecanone.

This product was mixed with 50 litres of water and 27 kg of a 30 % aqueous sodium hydroxide solution. The reaction mixture, after having been kept under stirring at 85°–90° during 5 hours, was cooled to room temperature and poured into 20 litres of toluene. After separation, the aqueous phase was extracted with more toluene (8 litres) and the combined organic extracts, after the usual treatments of washing and drying, were evaporated under reduced pressure. There were thus obtained 11.3 kg of crude product, which by fractional distillation yielded 9.525 kg of 2-[3-hydroxypropyl]-cyclododecanone, b.p. 138°–180°/0.2 Torr.

A solution of 9.525 kg of 2-[3-hydroxypropyl]-cyclododecanone and 500 g of 70 % benzenesulfonic acid in 30 kg of toluene was heated at reflux for 5 hours under stirring. The water (680 ml) formed during the reaction was directly distilled as soon as it formed. The reaction mixture, after cooling to 20°, was washed twice with water and neutralised with 20 litres of a 10 % aqueous solution of NaHCO$_3$. The organic phase, after separation and washing with water, was evaporated under reduced pressure to yield 9.370 kg of crude product. By fractional distillation, 7.7 kg of 13-oxabicyclo[10.4.0]hexadec-1(12)-ene, b.p. 110°–114°/0.2 Torr, were obtained. The yield, relative to 2-ethoxycarbonyl-cyclododecanone, was 69.3 %.

EXAMPLE 4

A solution of acrolein (196 g) in 300 ml of methanol was added dropwise at 0°–3° to a vigorously stirred solution of 2-ethoxycarbonyl-cyclododecanone (763 g, 3 Mole) and sodium methoxide (15 g) in 2 litres of methanol (1½ hours). The reaction mixture was then left at 0° during 30 additional minutes. The 2-ethoxycarbonyl-2-[3-oxopropyl]-cyclododecanone, obtained in the above process, was not isolated from the reaction mixture but was used as it stood for the next step.

To the above mixture sodium borohydride (30 g, 0.79 Mole) was added portionwise under stirring at 0°–3°, and the solution was kept at this temperature until thin-layer chromatographic analysis (SiO$_2$, benzene-ethyl acetate 9:1) revealed complete disappearance of the starting material.

A 30 % aqueous solution of sodium hydroxide (330 ml, 3.3 Mole) was added during 20 minutes to the above reaction mixture kept under vigorous stirring. The temperature, which at the beginning of the reaction was at 0°, increased up to 20° and it was then brought at 65–70 by means of an external water bath. The mixture was kept at this temperature during 3 hours and the sodium hydrogen carbonate (230 g) which precipitated during the above operation was isolated by filtration. The clear filtrate, after evaporation of the volatile components, gave a residue which, after dilution with 4 litres of water, was extracted with 2 litres of toluene. The organic phase, after the usual treatments of washing (4 litres of water), neutralisation (200 ml of 25 % sulphuric acid) and drying, yielded by evaporation 740 g of crude product. The subsequent fractional distillation of the crude product gave 609 g of 2-[3-hydroxypropyl]-cyclododecanone, b.p. 115°–160°–165°/0.1 Torr. The product thus obtained was used as it stood for the next step. IR: 3420, 1700 cm$^{-1}$.

2-[3-hydroxypropyl]-cyclododecanone (309 g) in 1000 ml of n-hexane was treated with 60 g of acidic diatomaceous earth. The reaction vessel was fitted with a lateral distillation apparatus in order to enable the direct distillation of the water formed during the reaction, 46 ml of water were recovered. After cooling, the suspension was filtered and the solid washed with hexane.

By evaporation of the volatile components, there was obtained a residue (600 g) which, by fractional distillation, yielded 510 g of 13-oxabicyclo[10.4.0]hexadec-1(12)-ene, b.p. 116°–120°/0.1 Torr. IR: 1660 cm$^{-1}$ By replacing in the above process acrolein by methacrolein and by methyl vinyl ketone respectively, 15-methyl-13-oxabicyclo[10.4.0]hexadec-1(12)-ene and 14-methyl-13-oxabicyclo[10.4.0]hexadec-1(12)-ene were obtained. The analytical constants of these compounds were as follows: 15-methyl-13-oxabicyclo[10.4.0]hexadec-1(12)-ene: d$_4^{20}$ = 0.9623; n$_D^{20}$ = 1.5018.

14-methyl-13-oxabicyclo[10.4.0]hexadec-1(12)-ene: d$_4^{20}$ = 0.9581; n$_D^{20}$ = 1.5037.

EXAMPLE 5

According to the same procedure as that described in Example 1, 12-hydroperoxy-13-oxa-14-methylbicyclo[10.3.0]-pentadecane (17.3 g) in xylene (100 ml) was decomposed in boiling xylene (100 ml). The residue (18.2 g) obtained by the usual treatment (cf. Example 1) gave by fractional distillation 13.7 g of a mixture of 14-methyl-14-tetradecanolide and 14-methyl-14-tetradec-(11 and 12)-enolide. By hydrogenating the above mixture 9 g of pure 14-methyl-14-tetradecanolide, b.p. 105°/0.1 Torr, were obtained. This product is a new compound which possesses very interesting odoriferous properties.

14-Methyl-12-hydroperoxy-13-oxabicyclo[10.3.0]-pentadecane, used as starting material for the above process was prepared as follows:

To a solution of 14-methyl-13-oxabicyclo[10.3.0]-pentadec-1(12)-ene (22.2 g, 0.1 Mole) in 100 ml of 90 % acetic acid at 0°, at 52 % aqueous solution of hydrogen peroxide and 5 g of concentrated sulphuric acid were added under stirring (3 minutes). According to the same procedure as that described in Example 1, 17.3 g of product were obtained. After recrystallisation from ethylacetate the pure 12-hydroperoxy-13-oxa-14-methylbicyclo[10.3.0]pentadecane had m.p. 118°–120°.

14-Methyl-13-oxabicyclo[10.3.0]pentadec-1(12)-ene, used as starting material for the preparation of the above peroxide, was obtained as follows: 2-Ethoxycarbonyl-cyclododecanone (254.3 g, 1 Mole) in 1000 ml of dimethyl formamide was added to a solution of sodium methoxide (59.4 g, 1.1 Mole) in 800 ml of dimethylformamide. To this mixture allylbromide (132 g, 1.1 Mole) in 200 ml of dimethylformamide was added at 50° under vigorous stirring (2 hours). After standing overnight at 50° under stirring, the mixture was subjected to evaporation under reduced pressure. The residue thus obtained was treated with 750 ml of water and 30 ml of glacial acetic acid and extracted with toluene. By evaporation of the combined organic extracts and fractional distillation of the residue under high vacuum (0.03 Torr), 266.9 g of 2-allyl-2-ethoxycarbonyl-cyclododecanone were obtained, m.p. 58°–60°.

A mixture of 200 g of 2-allyl-2-ethoxycarbonyl-cyclododecanone, 400 ml of ethanol and 300 ml of a 30 % aqueous sodium hydroxide solution was stirred during 4 hours at reflux temperature. After evaporation of the alcohol at reduced pressure, the mixture was treated with toluene and this solution washed with an aqueous solution of NaCl until neutral. The aqueous phase was extracted with more toluene and the combined organic extracts were evaporated to dryness. The residue thus obtained (136.5 g) gave by fractional distillation 116.1 g of 2-allyl-cyclododecanone, b.p. 92°–8°/0.03 Torr.

63 g. of 2-allyl-cyclododecanone were added at 0° over a period of 20 minutes to 600 g of 90 % $H_2SO_4$ under vigorous stirring. After 2 additional hours of stirring, the temperature of the reaction mixture was increased to 10°, and the mixture was then poured onto water/ice. The extraction with ethyl acetate followed by the usual treatments of washing, drying and evaporation of the combined organic extracts gave a crude product (65 g) which, by fractional distillation, yielded 54 g of 14-methyl-13-oxabicyclo[10.3.0]pentadec-1(12)-ene, b.p. 105°/0.1 Torr.

EXAMPLE 6

A suspension of 12-hydroperoxy-13-oxabicyclo[10.4.0]-hexadecane (25.6 g) in 500 ml of dioxan in an atmosphere of argon was irradiated during 5 hours by means of a 125 Watt mercury lamp. During such a process, the reaction vessel was externally cooled in such a way as to keep the temperature of the suspension below 25°. There was thus obtained a solution which, after evaporation of the volatile components, gave 28.1 g of a crude material. The subsequent fractional distillation yielded a 1:1 mixture of 15-pentadecanolide and 15-pentadec-(11 and 12)-enolide, b.p. 92°/0.1 Torr (18.9 g).

EXAMPLE 7

10 g of di-[13-oxabicyclo[10.4.0]hexadec-12-yl]-peroxyde were irradiated according to the same procedure as that described in Example 6. 11 g of crude material yielded by fractional distillation 6 g of a mixture ca. 1:1 of 15-pentadecanolide and 15-pentadec-(11 and 12)-enolide, b.p. 95°–6°/0.1–0.2 Torr.

EXAMPLE 8

A solution of 665 g of 12-hydroperoxy-13-oxabicyclo[10.4.0]hexadecane in 5 litres of chloroform and 1.5 litres of isopropylalcohol was added dropwise (2¼ hours) to a vigorously stirred neutral aqueous solution (pH ca. 7.0) of sodium sulphite (375 g) and sodium hydrogen sulphite (70 g). The temperature, which at the beginning of the reaction was at 21°, increased rapidly to 27°–28° and the addition of the peroxide was set at such a rate as to maintain the temperature of the reaction mixture within said range. After subsequent stirring during ½ hour, a thin-layer-chromatographic analysis ($SiO_2$, benzene/ethyl acetate 9:1) revealed total disappearance of the starting material. The organic phase was decanted and the aqueous solution extracted with 300 ml of chloroform. The combined extracts were washed twice with 4 litres of a 10 % aqueous solution of sodium hydrogen carbonate and water, dried over anhydrous sodium sulphate and evaporated to dryness under reduced pressure.

The residue (860 g) thus obtained yielded 567 g of a mixture consisting of 15-cyclopentadecanolide (ca. 50 %), 15-pentadec-(11 and 12)-enolide (ca. 25 %), 12-hydroxy-15-pentadecanolide (7.6 %) and 13-oxabicyclo[10.4.0]hexadec-1(12)-ene (17.4 %) as revealed by vapour phase chromatographic analysis.

The mixture (567 g) obtained in the above process was subjected to hydrogenation according to the same procedure as that described in Example 1. The following quantities were used:

1.5 litres of ethanol
90 g of a 30 % Raney nickel suspension
30 ml of a 5 % aqueous solution of $Na_2CO_3$.

12.5 litres of hydrogen were consumed in a complete hydrogenation period of 17 hours. The residue obtained by evaporation of the volatile components under reduced pressure was diluted with ca. 700 ml of ether and the mixture washed with water until neutral. The organic phase, subjected to the usual treatments of drying and evaporation, gave by distillation 545 g of a mixture, b.p. 100°–155°/0.1 Torr, consisting of 15-cyclopentadecanolide (76.2 %), 12-hydroxy-15-pentadecanolide (8.4 %) and 13-oxabicyclo[10.4.0-]hexadec-1(12)-ene (15.4 %).

Fractional redistillation of the above mixture gave 380 g of 15-cyclopentadecanolide, b.p. 101°–105°/0.1 Torr.

By replacing in the above process 12-hydroperoxy-13-oxabicyclo[10.4.0]hexadecane by 12-hydroperoxy-13-oxa-14-methylbicyclo[10.4.0]hexadecane and 12-hydroperoxy-13-oxa-15-methylbicyclo[10.4.0]hexadecane respectively, mixtures consisting of 15-methyl-15-pentadecanolide, 15-methyl-15-pentadec-(11 and 12)-enolide and 12-hydroxy-15-methyl-15-pentadecanolide, and 14-methyl-15-pentadecanolide, 14-methyl-15-pentadec-(11 and 12)-enolide and 12-hydroxy-14-methyl-15-pentadecanolide were obtained with similar yields.

By hydrogenation of said mixtures and subsequent fractional distillation 15-methyl-15-pentadecanolide ($d_4^{20}$ = 0.9399, $n_D^{20}$ = 1.4700) and 14-methyl-15-pentadecanolide ($d_4^{20}$ = 0.9499, $n_D^{20}$ = 1.4728) were obtained.

12-Hydroperoxy-13-oxa-14-methylbicyclo[10.4.0]-hexadecane and 12-hydroperoxy-13-oxa-15-methylbicyclo[10.4.0]-hexadecane can be prepared according to the same procedure as that described in Example 1 for the preparation of 12-hydroperoxy-13-oxabicyclo[10.4.0]hexadecane. They showed the following analytical data.

12-hydroperoxy-13-oxa-14-methylbicyclo[10.4.0]hexadecane: m.p. 109°–110°, dec. p. ca. 140°.

12-hydroperoxy-13-oxa-15-methylbicyclo[10.4.0]hexadecane: m.p. 106°–108°, dec. p. ca. 140°.

We claim:

1. A compound of the formula $$R^1—O—O—R^2$$ I wherein $R^1$ represents hydrogen, an alkyl, cycloalkyl, aralkyl, aryl or acyl radical each containing from 1 to 7 carbon atoms or a group of formula

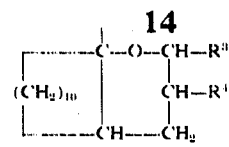

II and $R^2$ represents a group of formula II, provided that when $R^1$ and $R^2$ represent a group of formula II they are identical.

2. The compound 12-tert-butylperoxy-13-oxabicyclo [10.4.0] hexadecane.

3. The compound di-[13-oxabicyclo [10.4.0] hexadec-12-yl] peroxide.

4. The compound 12-hydroperoxy-13-oxa-14-methylbicyclo [10.4.0] hexadecane.

5. The compound 12-hydroperoxy-13-oxa-15-methylbicyclo [10.4.0] hexadecane.

6. The compound 12-hydroperoxy-13-oxabicyclo [10.4.0] hexadecane.

* * * * *